United States Patent [19]
Hulyalkar

[11] Patent Number: 5,832,041
[45] Date of Patent: Nov. 3, 1998

[54] 64 QAM SIGNAL CONSTELLATION WHICH IS ROBUST IN THE PRESENCE OF PHASE NOISE AND HAS DECODING COMPLEXITY

[75] Inventor: Samir N. Hulyalkar, White Plains, N.Y.

[73] Assignee: Philips Electronics North America Corporation

[21] Appl. No.: 327,175

[22] Filed: Oct. 21, 1994

[51] Int. Cl.$^6$ ................................................. H03D 1/00
[52] U.S. Cl. ........................... 375/340; 375/261; 329/304
[58] Field of Search ................................. 375/261, 244, 375/340, 346, 348, 316; 371/43.144, 45; 329/304

[56] References Cited

U.S. PATENT DOCUMENTS

| | | | |
|---|---|---|---|
| 4,271,527 | 6/1981 | Armstrong | 375/261 |
| 4,439,863 | 3/1984 | Bellamy | 375/261 X |
| 4,562,425 | 12/1985 | Turner et al. | 375/244 X |
| 4,646,326 | 2/1987 | Backof, Jr. et al. | 375/261 |
| 4,651,320 | 3/1987 | Thapar | 375/261 |
| 4,660,213 | 4/1987 | Holsinger et al. | 375/39 |
| 5,305,352 | 4/1994 | Calderbank et al. | 375/261 |

OTHER PUBLICATIONS

D. Divasalar et al., Multiple–symbol differential detection of MPSK , IEEE Transactions on Communications, vol. 38, No. 3, Mar. 1990, pp. 300–308.

D. Makrakis et al., Trellis coded noncoherent QAM: a new bandwidth and power efficient scheme , 39th IEEE Vehicular Tech. Conf., pp. 95–100, May 1989.

W.T. Webb, QAM: the modulation scheme for future mobile radio communications? , electronics & Communication Engineering Journal, Aug. 1992, pp. 167–176.

E.A. Lee et al., *Digital Communication,* Kluwer Academic Publishers, Boston, 1988, Chapter 6.

J. Spliker, *Digital Communication by Satellite,* Prentice Hall, NJ, 1977, Chapter 12.

G.J. Foschini et al., "On the selection of a two–dimensional signal constellation in the presence of phase jitter and Gaussian noise", The Bell System Technical Journal, vol. 52, No. 6, pp. 927–967, Jul.–Aug. 1973.

B.W. Kernighan et al., "Heuristic solution of a signal design design optimization problem", Them Bell System Technical Journal, vol. 52, No. 7, pp. 1145–1159, Sep. 1973.

K. Pahlavan, "Nonlinear Quantization and the of coded and uncoded signal constellations", IEEE Transactions on Communications, vol. 39, No. 8, pp. 1207–1215, Aug. 1991.

*Primary Examiner*—Tesfaldet Bocure
*Assistant Examiner*—Bryan Webster
*Attorney, Agent, or Firm*—Anne E. Barschall

[57] ABSTRACT

A 64 QAM signal constellation reduces phase noise as compared with a rectangular constellation, but requires a fairly simple decoder. The constellation has decision regions which are approximately rectangular; allows for quadrant decoding; and has constellation points representable by a small number of bits.

21 Claims, 11 Drawing Sheets

64 QAM SIGNAL CONSTELLATION WHICH IS ROBUST IN THE PRESENCE OF PHASE NOISE AND HAS DECODING COMPLEXITY

I. BACKGROUND OF THE INVENTION

A. Field of the Invention

The invention relates to the field of signal constellations for 64 QAM (quadrature amplitude modulated) signals and to consumer grade receivers for receiving such signals.

B. Related Art

For digital data transmission over CATV channels to be cost-effective, a consumer grade receiver must be built. At the front-end of such a receiver, a tuner frequency translates the RF band of interest down to baseband. A commercial grade tuner inserts a significant amount of phase noise. This phase noise can cause a rectangular 64 QAM signal to possess an irreducible error rate. In other words, the system will not operate reliably even with an infinite signal to noise ratio (SNR).

Previous efforts have been made to reduce phase noise in 64 QAM receivers. These include G. J. Foschini, R. D. Gitlin, and S. B. Weinstein, "On the selection of a two-dimensional signal constellation in the presence of phase jitter and Gaussian noise," BSTJ, vol.52, no. 6, pp.927–967, July–August, 1973.

B. W. Kernighan and S. Lin, "Heuristic solution of a signal design optimization problem,"BSTJ, vol. 52, no. 7, pp. 1145–1159, September, 1973

K. Pahlavan, "Nonlinear Quantization and the design of coded and uncoded signal constellations," IEEE Trans Comm., vol. 39, no. 8, pp. 1207–1215, August, 1991 U.S. Pat. No. 4,660,213

These efforts have provided some QAM constellation design which provide improved performance in phase noise. However, the resulting decoders are unacceptably complex, because of arbitrary decision regions necessary to implement the arbitrarily spaced constellation points.

Decoder complexity becomes an important issue in high speed data communication, since decision directed implementations require extremely fast decoding, necessitating the use of an extremely complex ROM for general maximum-likelihood (ML) decoding.

Further background material may be found in:

E. A. Lee and J. G. Messerschmitt, *Digital Communication*, Kluwer Academic Publishers, Boston, 1988, in which chapter 6 deals with decoders for 64 QAM signals. and J. Spilker, *Digital Communication by Satellite*, Prentice Hall, N.J., 1977, in which Chapter 12 deals with phase noise in 4 QAM signals

II. SUMMARY OF THE INVENTION

Accordingly, it is an object of the invention to create a 64 QAM signal constellation which has low phase noise and also low decoding complexity.

It is also an object of the invention to create a decoder for decoding such a 64 QAM signal.

This object is achieved using a signal having a constellation including the following points, or a scaled version thereof, in the first quadrant of the Cartesian plane: (1.500, 7.500),(1.125,5.250),(3.375,5.625), (5.625,5.625),(0.750, 3.750),(2.250,3.750), (3.750,3.750),(5.625,3.375),(0.750, 2.250), (2.250,2.250),(3.750,2.250), (0.750,0.750), (2.250, 0.750), (3.750,0.750), (5.250,1.125), (7.500,1.500).

Advantageously, this constellation may be scaled by a factor of 2⅔ to reduce the number of bits used in decoding.

The object may also be achieved with a constellation using the following points, or a scaled version thereof, in the first quadrant of the Cartesian plane: (4,20), (4,14), (8,16), (16,16), (2,10), (6,10), (10,10), (2, 6), (6,6,), (10,6), (16,8), (2,2), (6,2), (10,2), (14,4), (20,4); although this constellation has been shown to give d signal more susceptible to additive noise than the first constellation.

Boundaries for decision regions for these points can be found according to the conventional technique of bisecting lines between adjacent points of the constellations. However, approximated decision regions, with shapes which are more nearly rectangular are cheaper to implement. The approximated decision regions create a slightly higher error rate in recognizing decision points, but reduce complexity of the resulting decoder.

III. BRIEF DESCRIPTION OF THE DRAWING

The invention will now be described by way of non-limiting example with reference to the following drawings.

Figure 6:
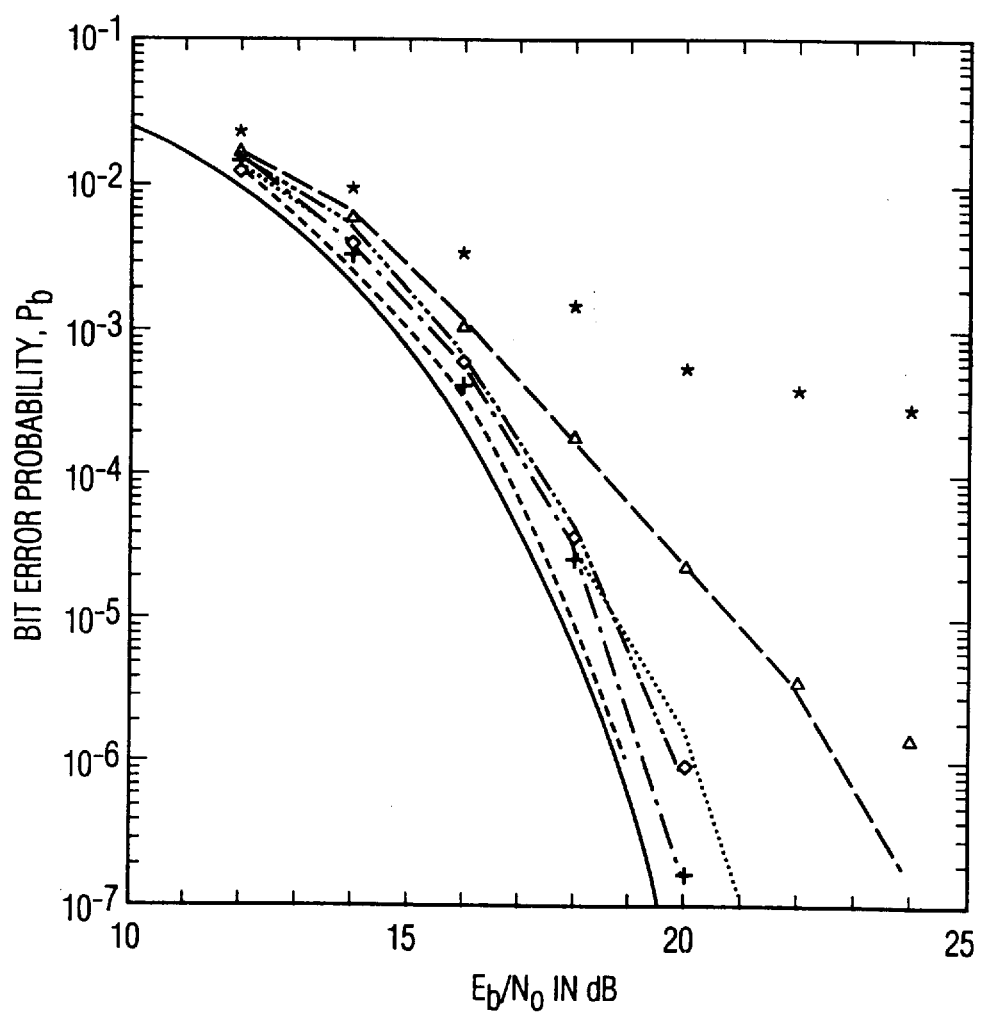

FIG. 6 comparative performance of signal decoding schemes.

Figure 7:
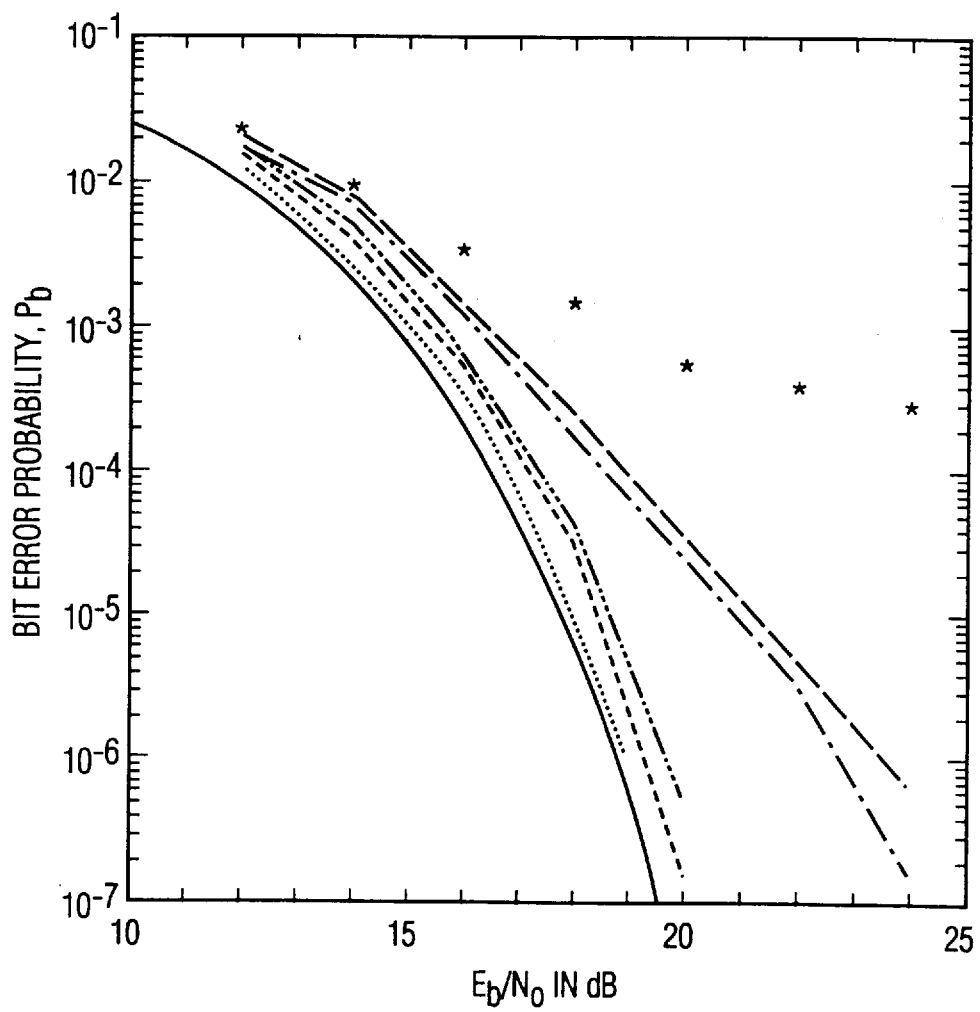

FIG. 7 comparative performance of signal decoding schemes.

Figure 8:
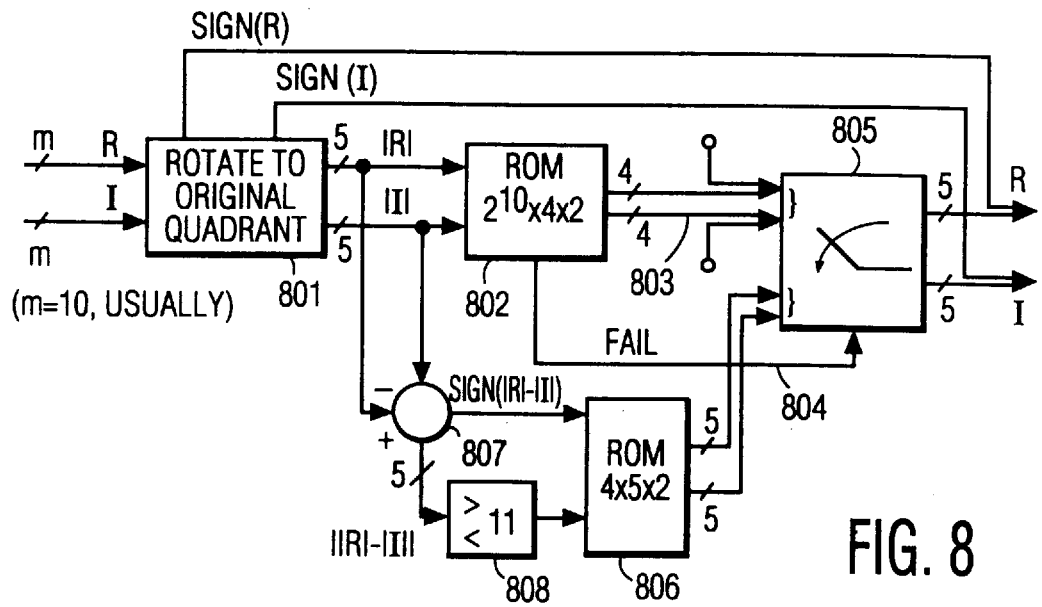

FIG. 8 shows a decoder for decoding Cons. A.

Figure 9:
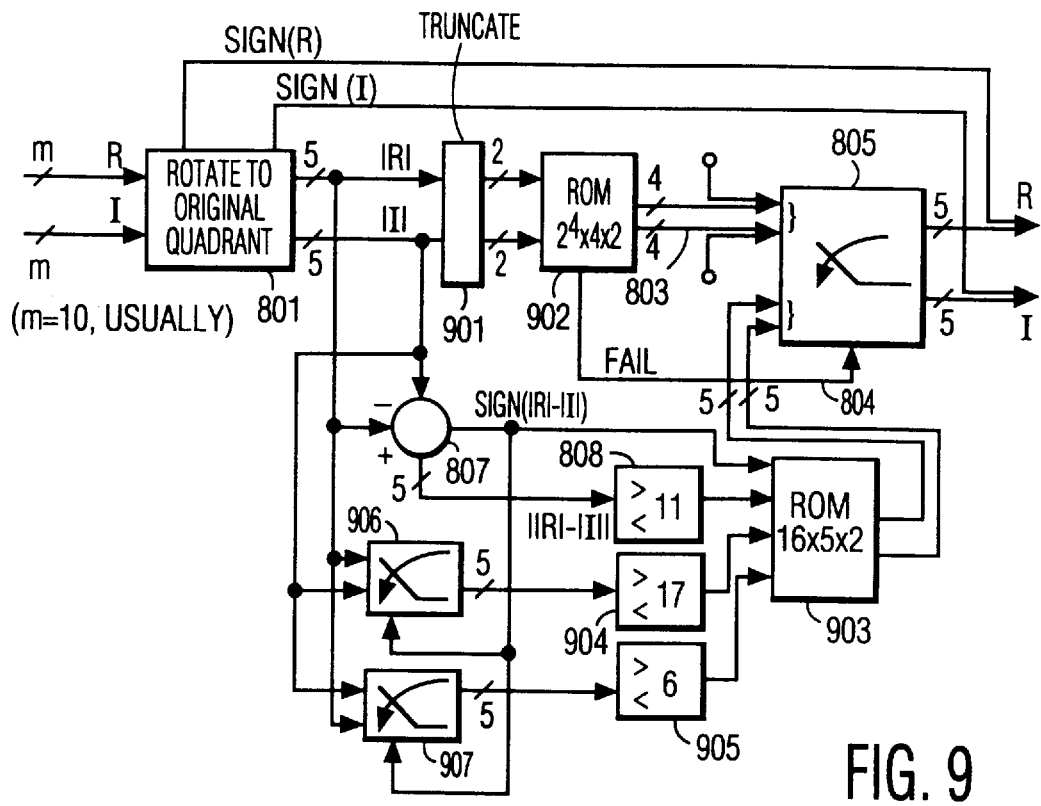

FIG. 9 shows an alternate embodiment for a decoder for decoding Cons. A.

Figure 10:
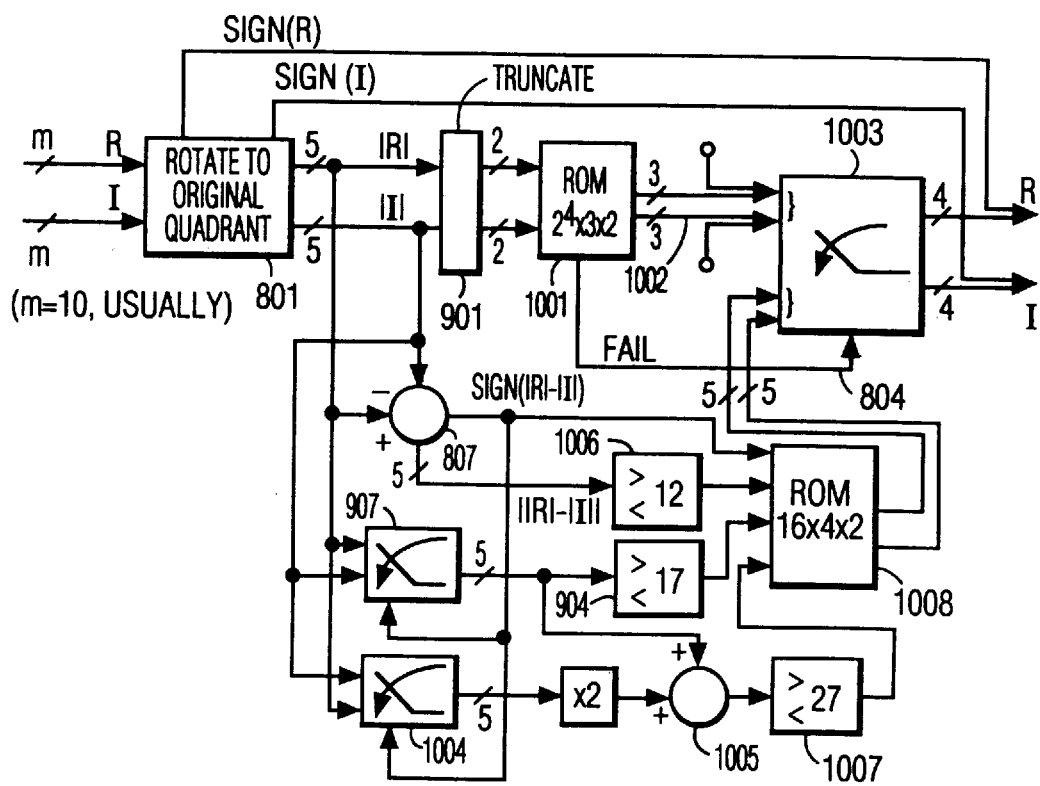

FIG. 10 shows a decoder for decoding Cons. B.

IV. DETAILED DESCRIPTION OF THE PREFERRED EMBODIMENTS

A baseband QAM transmitted signal can be written as $$\tilde{s}(t) = \alpha \sum_{n \in I} \tilde{A}_n g(t - nT_s), \quad (1)$$

where $T_S$ is the symbol time interval, $\alpha$ is a scaling factor, I is the space of integers and $\tilde{A}_n$ is the QAM input symbol stream which can take on complex values corresponding to a given QAM constellation. Also g(t) is an arbitrary shaping function which is typically chosen to have a square-root raised-cosine (SQRC) spectrum to maximize the SNR. and minimize the inter-symbol interference (ISI). The transmitted signal is then given by $$s(t) = Re\{\tilde{s}(t)\exp(jw_c t)\}, \quad (2)$$

where $w_c$ is the carrier frequency in radians.

Figure 1:
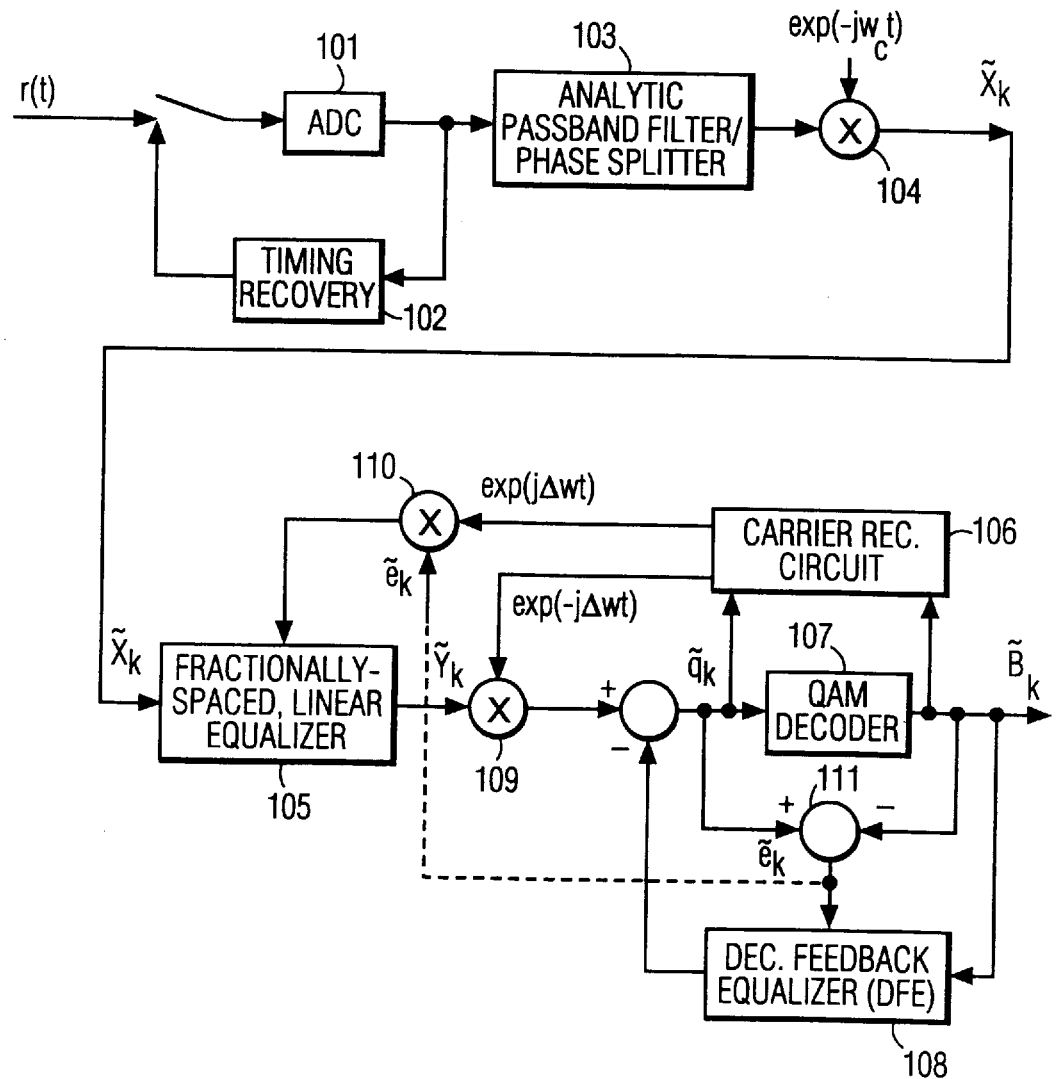
FIG. 1 shows a prior art QAM receiver.

At the receiver, the transmitted signal is first subjected to IF filtering. Then the signal spectrum is frequency shifted to close to DC, so that the entire two-sided QAM spectrum is in the passband. This frequency-shifting is accomplished using a tuner, The tuner introduces phase noise into the system. The output of the tuner, when subjected to programmable gain control used to restrict peak values, will be called r(t) herein, and is shown as the input to FIG. 1, which is a prior art QAM receiver, as shown in chapter 6 of the Lee et al book cited above. The signal r(t) is presented to the analog to digital converter 101, and then fed to a timing recovery circuit 102 which controls the clock phase of the analog to digital converter 101 with a feedback loop as shown.

An analytic filter 103, with a SQRC filter characteristic, operates on the output of the analog to digital converter 101. After a frequency shift to the baseband at 104, the signal, now called $\tilde{X}_k$, is sent to an adaptive equalizer 105. Due to oscillator imperfections, there is a residual frequency offset between the transmitter and the receiver and also an associated phase jitter in the output $\tilde{Y}_k$ of the adaptive equalizer 105 which must be corrected by the carrier recovery circuit 106 which follows the adaptive equalizer. This correction is implemented by using the complex multiplier 109 after the adaptive equalizer as shown. This multiplier is followed by the QAM decoder 107 which finally performs a mapping from the complex noisy input to the complex symbol output $\tilde{B}_k$. A decision-feedback equalizer (DFE) 108 may also be used. The tap-adaptation of the adaptive equalizer uses the error between the decoded output and the noisy signal, along with the correction required due to the carrier recovery circuit, shown in the form of the complex multiplier 110. The DFE uses only the error signal out of the element 111.

For decision-directed implementations, an error signal $\tilde{e}_k \exp(j\Delta wt)$ is used as an input to fine-tune the equalizer tap coefficients. Also the QAM decoder acts as a the slicer. The output $\tilde{B}_k$ is used in the carrier recovery loop as well as in the DFE.

The QAM decoding must be performed as quickly as possible to avoid delays in the decision-directed loops.

Assuming that the adaptive equalizers remove the intersymbol interference (ISI) completely, it can then be seen that $$\tilde{q}_k = \tilde{A}_k \exp(j\phi_k) = \tilde{n}_k, \tag{3}$$

where $\tilde{n}_k$ is the complex additive noise and $\phi_k$ is the residual phase noise that is left uncorrected by the carrier-recovery circuit.

Figure 2:
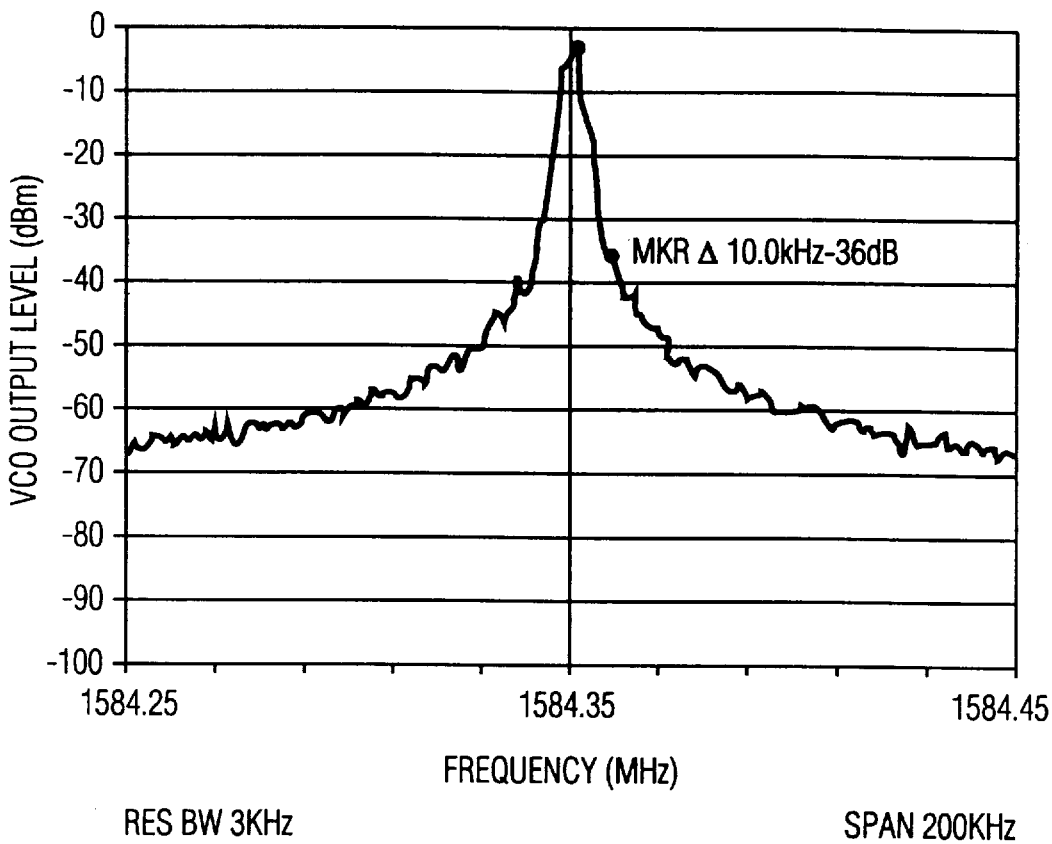
FIG. 2 shows phase noise characteristics of a prior art voltage-controlled oscillator/tuner.

FIG. 2 shows the phase noise characteristics of a voltage-controlled oscillator VCO in a tuner designed by ANADIGICS The phase noise level at a 100 kHz offset is about −100 dBc/Hz. At this bandwidth, phase noise level has essentially flattened out. As discussed in the Spilker book, chapter 12, mentioned above, this section of the phase noise will appear essentially unaltered by the phase-locked loop (PLL) in the carrier recovery circuit 106, even when the bandwidth is made considerably larger than 100 kHz. Typically, the PLL is used to track low-frequency jitter, while the high-frequency jitter is left uncorrected for optimal results. The output of the PLL has phase noise components because of the additive noise, $\tilde{n}_k$, and also due to the low-frequency jitter. The phase noise components due to additive noise can be ignored by assuming that the SNR is large. Also, the low-frequency jitter is inversely proportional to the PLL bandwidth. Hence, with a proper selection of the PLL parameters, it is possible to reduce this jitter significantly. As a first-order approximation, then, the phase noise, $\phi_k$, can be assumed to be the uncorrected flat-portion of the tuner noise as shown in FIG. 2. In other words, for a symbol rate of 5 MHz, the flat portion is from about 100 kHz to about 3 MHz. This phase noise can then be conveniently modeled to have a Gaussian distribution with zero mean and the variance which is given by the area under the curve in FIG. 2 between 100 kHz and 3 MHz. This area is approximated by the level at 100 kHz times the frequency band. A Gaussian phase noise distribution can then be used to evaluate the performance of various QAM constellations in the presence of phase noise.

It is possible to design QAM constellations which are more robust to phase noise, as discussed in the background of the invention. However, a good QAM constellation must take decoding complexity into account. For small decoding complexity, the following constraints must be satisfied:

1. The decision regions should preferably be rectangular, such that the boundaries of these regions are representable by as small a number of bits as possible. Since arbitrary scaling can be assumed, this implies that all the decision boundaries should be representable by integer multiples of a fixed quantity, such that the largest such integer is a small number.

2. Quadrant decoding should be allowed. One way to ensure this is to make the constellation in a quadrant symmetric about the y=x line, or about an angle of 45 degrees. In general only the nearest points to the X and the Y axes need be symmetric, so that the decision regions include the X and the Y axes.

3. The constellation points must be representable by a small number of bits, using the same scaling assumed above. This is because the ROM size is directly proportional to this number.

In the above-mentioned article by Pahlavan a 64 QAM constellation is proposed which allows for quadrant decoding. The resulting decision boundaries, when determined by the conventional technique of bisecting lines connecting adjacent points of the constellation, are difficult to implement.

Figure 3A:
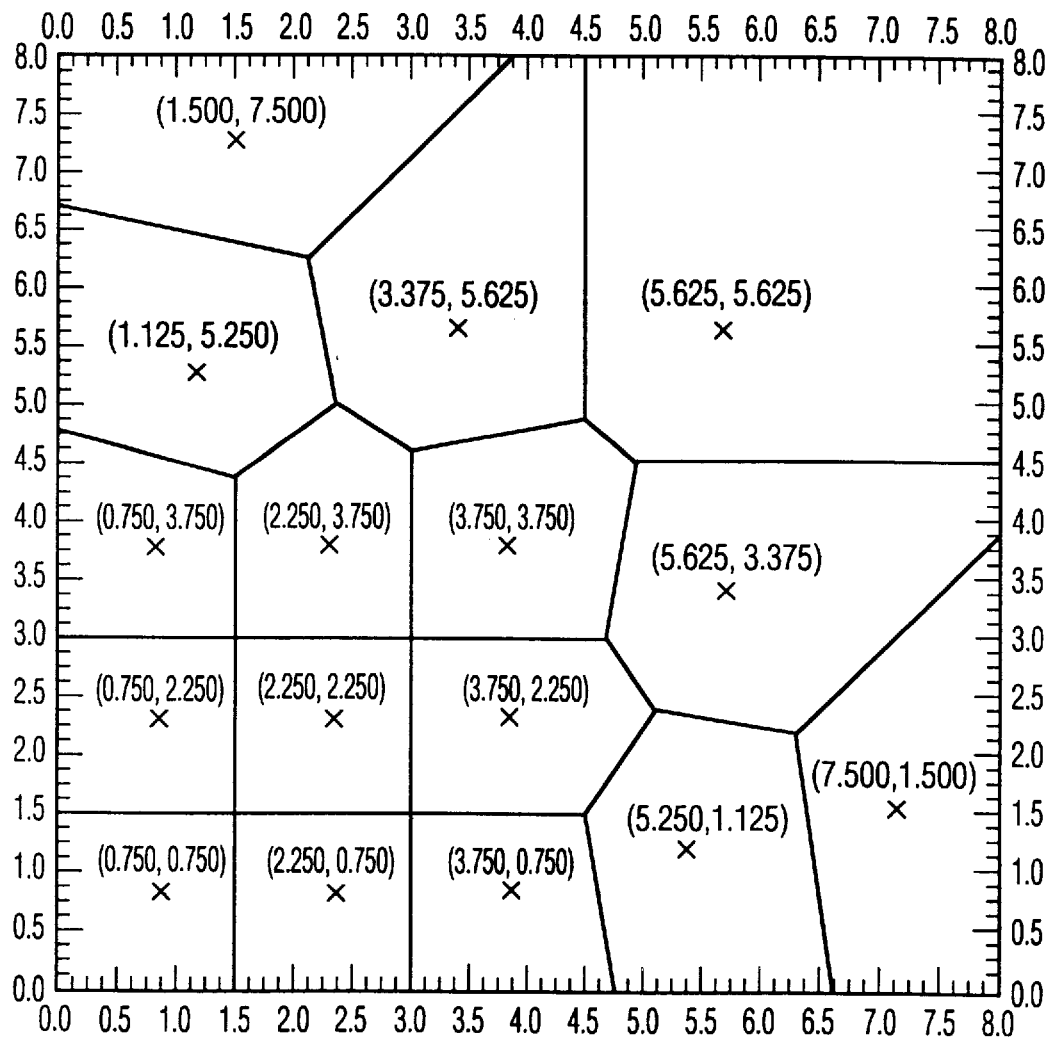
FIG. 3a shows a signal constellation in accordance with the invention (Cons. A) with a first type of decision regions.
Figure 3B:
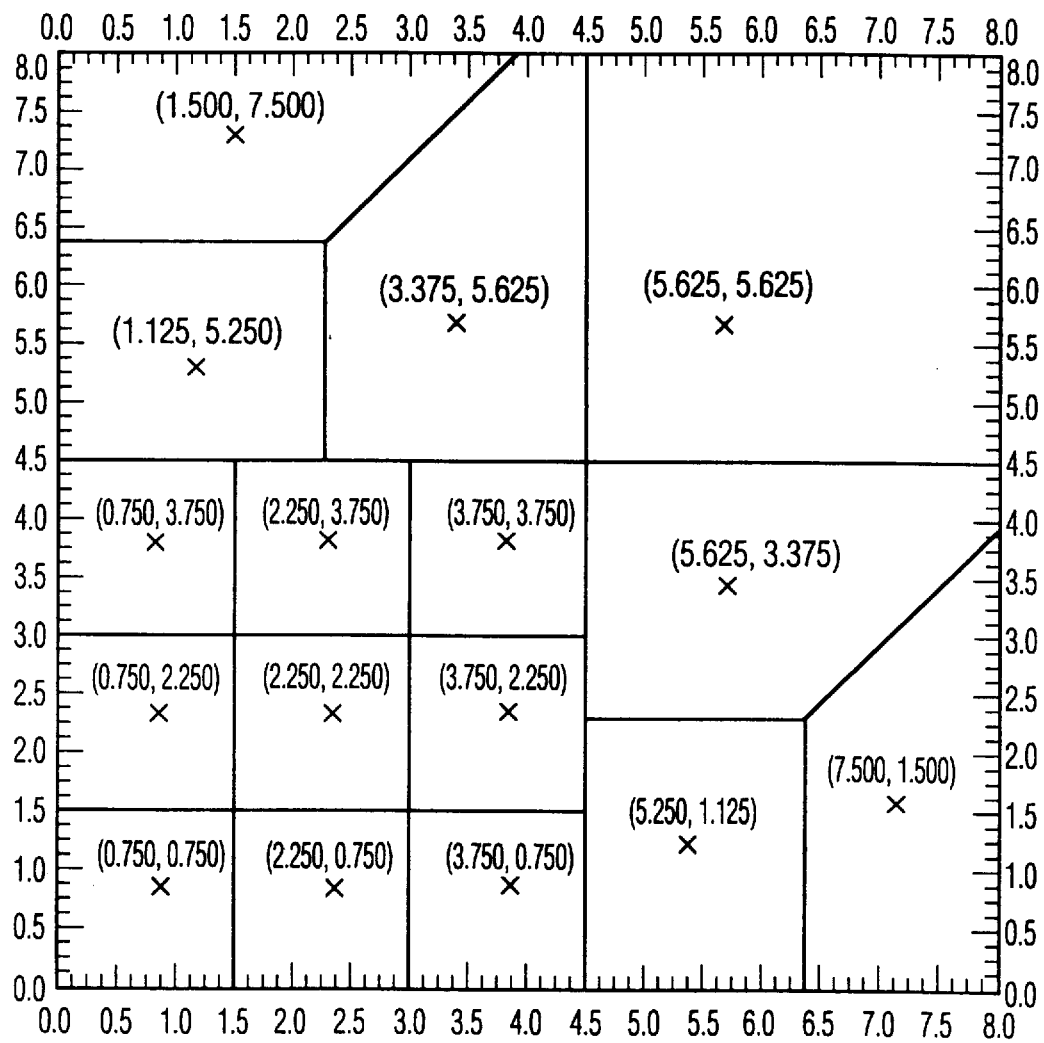
FIG. 3b shows Cons. B with a second type of decision regions

An improvement on the Pahlavan constellation according to the invention is shown in FIGS. 3a and 3b. The constellation points here are (1.500,7.500), (1.125,5.250), (3.375, 5.625), (5.625,5.625), (0.750,3.750), (2.250,3.750), (3.750, 3.750), (5.625,3.375), (0.750,2.250), (2.250,2.250),(3.750, 2.250), (0.750,0.750), (2.250,0.750), (3.750,0.750), (5.250, 1.125), (7.500,1.500).

The boundaries of the decision regions can be determined by bisecting lines between adjacent points as shown in FIG. 3a. For most of the points, this yields rectangular decision regions, which are easy to implement in a decoder. For some of the points, the resulting non-rectangular decision regions are more expensive to implement and are shown as jagged lines.

These jagged lines can be approximated in many cases by rectangular decision regions, shown in FIG. 3b. These approximated regions give slightly noisier performance in exchange for much decreased decoder complexity. The approximated decision regions are as indicated in the following table:

TABLE I

| Point | Intersection of the following regions being the decision region for the corresponding point |
|---|---|
| (1.500,7.500) | x≧0;y≧6.375;y≧x+4.125 |
| (1.125,5.250) | y≦6.375;y≧4.5;x≧0;x≦2.250 |
| (3.375,5.625) | x≧2.25;x≦4.5;y≧4.5;y≦x+4.125 |
| (5.625,5,625) | y≧4.5;x≧4.5 |

TABLE I-continued

| Point | Intersection of the following regions being the decision region for the corresponding point |
|---|---|
| (0.750,3.750) | x≥0;x≤1.5;y≥3;y≤4.5 |
| (2.250,3.750) | x≥1.5;x≤3;y≥3;y≤4.5 |
| (3.750,3.750) | x≥3;x≤4.5;y≥3;y≤4.5 |
| (5.625,3.375) | y≤2.25;y≤4.5;x≥4.5;y≥x−4.125 |
| (0.750,2.250) | x≥0;x≤1.5;y≥1.5;y≤3 |
| (2.250,2.250) | x≥1.5;x≤3;y≥1.5;y≤3 |
| (3.750,2.250) | x≥3;x≤4.5;y≥1.5;y≤3 |
| (0.750,0.750) | x≥0;x≤1.5;y≥0;y≤1.5 |
| (2.250,0.750) | x≥1.5;x≤3;y≥0;y≤1.5 |
| (3.750,0.750) | x≥3;x≤4.5;y≥0;y≤1.5 |
| (5.250,1.125) | x≥4.5;x≤6.375;y≥0;y≤2.25 |
| (7.500,1.500) | x≥6.375;y≥0;y≤x−4.125 |

Figure 4:
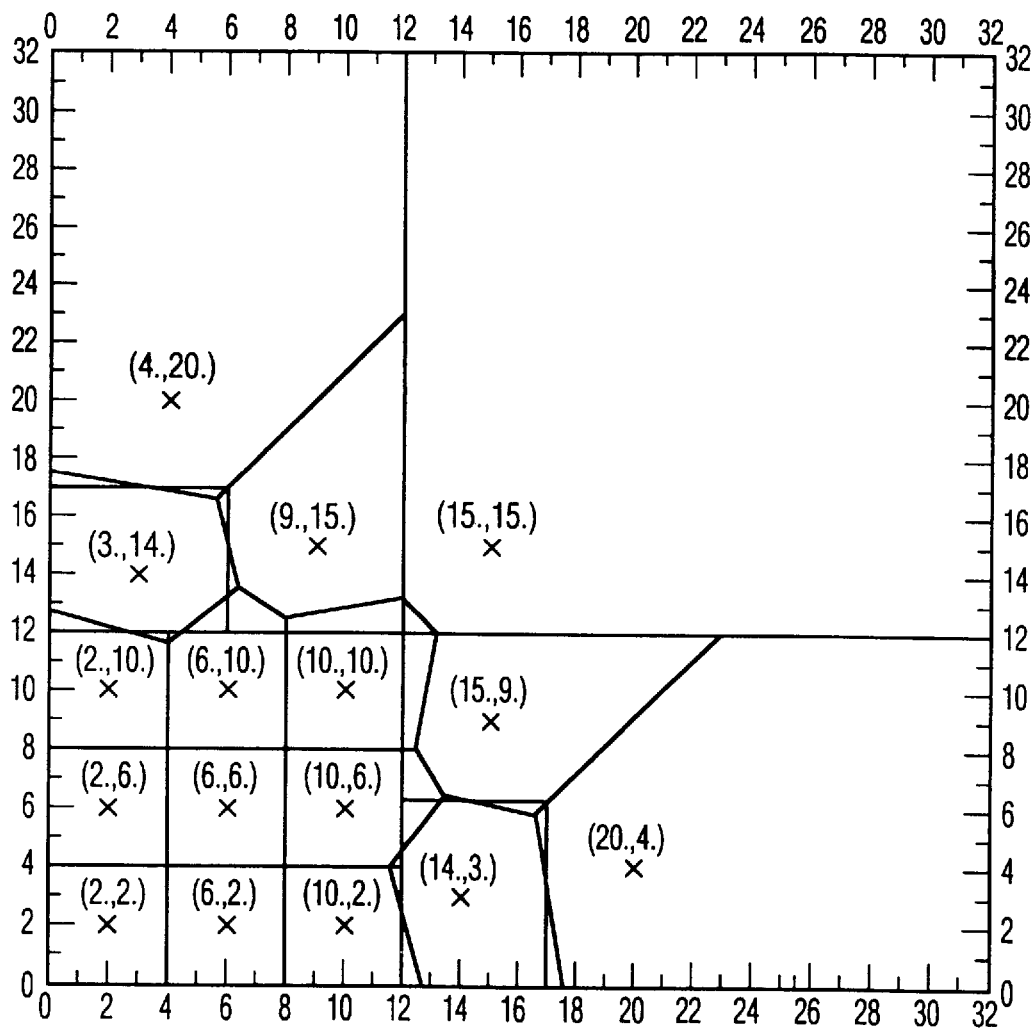
FIG. 4 shows a scaled version of FIG. 3.

Alternatively a scaled constellation, as shown in FIG. 4, may be used. Both types of decision region are shown in the figure, superimposed on one another. This constellation requires that incoming signal points be scaled by a factor of 2⅔ prior to being presented to the decoder. The scaled points are (4,20), (3,14), (9,15), (15,15), (2,10), (6,10) (10,10), (15,9), (2,6), (6,6), (10,6), (2,2), (6,2), (10,2), (14,3), (20,4). The scaled decision regions, with approximated rectangular boundaries, are indicated in the following table:

TABLE II

| Point | Intersection of the following regions being the decision region for the corresponding point |
|---|---|
| (4,20) | y≥17;x≥0;y≥x+11 |
| (3,14) | x≥0;x≤6;y≥12;y≤17 |
| (9,15) | x≥6;x≤12;y≥12;y≤x+11 |
| (15,15) | x≥12;y≥12; |
| (2,10) | x≥0;x≤4;y≥8;y≤12 |
| (6,10) | x≤4;x≤8;y≥8;y≤12 |
| (10,10) | x≥8;x≤12;y≥8;y≤12 |
| (15,9) | x≥12;y≥6;y≤12;y≥x−11 |
| (2,6) | x≥0;x≤4;y≥4;y≤8 |
| (6,6) | x≥4;x≤8;y≥4;y≤8 |
| (10,6) | x≥8;x≤12;y≥4;y≤8 |
| (2,2) | x≥0;x≤4;y≥0;y≤4 |
| (6,2) | x≥4;x≤8;y≥0;y≤4 |
| (10,2) | x≥8;x≤12;y≥0;y≤4 |
| (14,3) | x≥12;x≤17;y≥0;y≤6 |
| (20,4) | x≥17;y≥0;y≤x−11 |

Figure 5A:
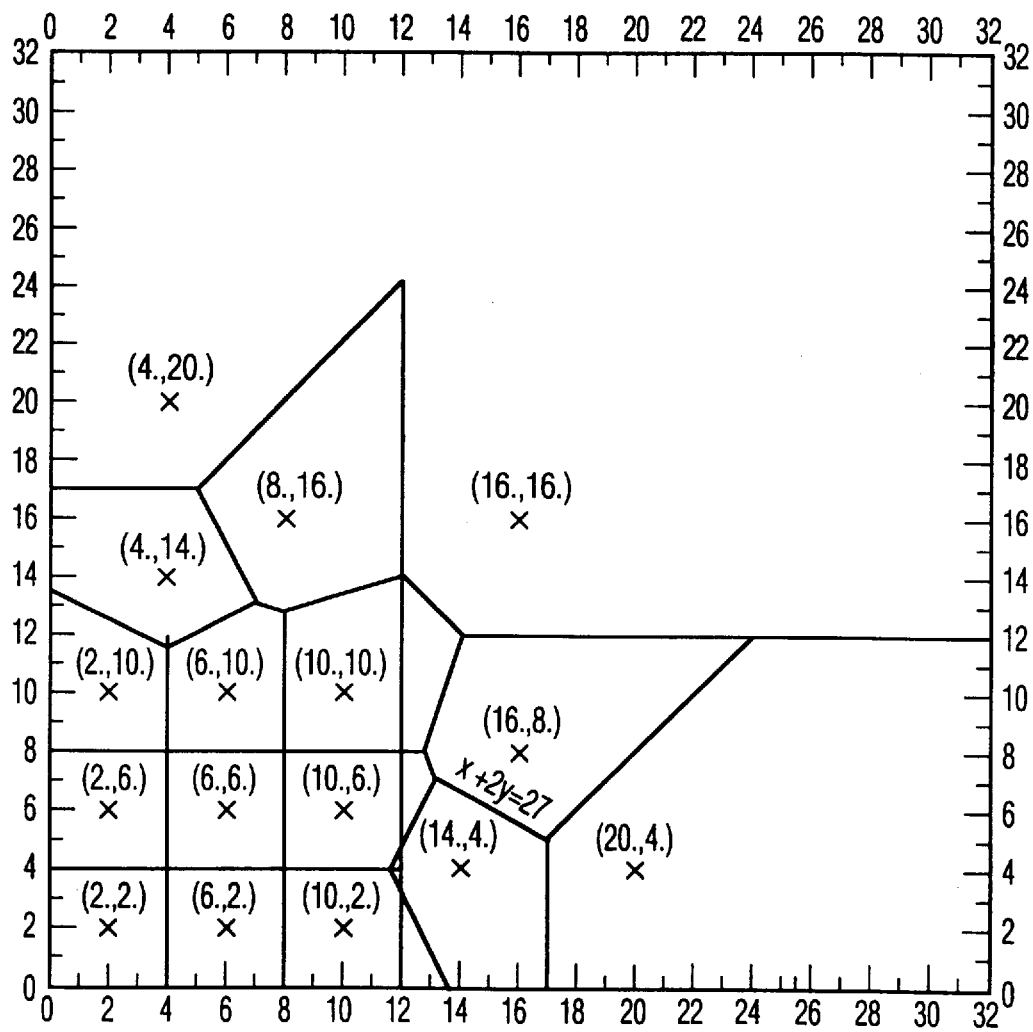
FIG. 5a shows a second signal constellation in accordance with the invention (Cons. B) with the first type of decision regions.
Figure 5B:
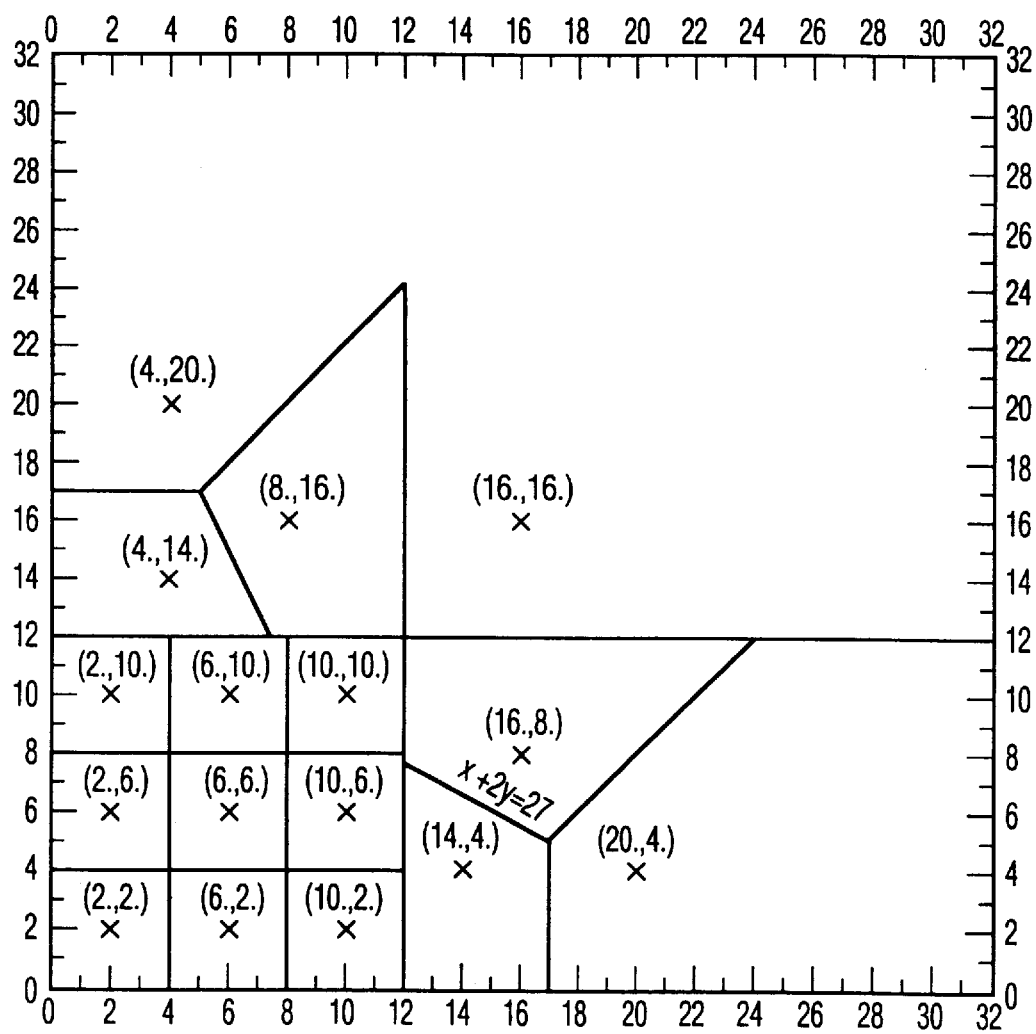
FIG. 5b shows Cons. B with the second type of decision regions.

FIGS. 5a and 5b show a second constellation (Cons. B) in accordance with the invention. This constellation does not perform quite as well as the constellations of FIGS. 3a, 3b and 4. The constellation points of this constellation are: (4,20), (4,14), (8,16), (16,16), (2,10), (6,10), (10,10), (2,6), (6,6,), (10,6), (16,8), (2,2), (6,2), (10,2), (14,4), (20,4).

Again, decision regions can be determined by bisecting lines between adjacent points as shown in FIG. 5a. For many of the points, however, this yields non-rectangular decision regions, as indicated by the jagged lines in the figure. More nearly rectangular approximated decision regions can be chosen, as shown in FIG. 5b. These approximated decision regions give slightly suboptimal performance but are much cheaper to implement in the decoder. The more nearly rectangular approximated decision regions are as indicated in the following table:

TABLE III

| Point | Intersection of the following regions being the decision region for the corresponding point |
|---|---|
| (4,20) | x≥0;x≤12;y≥17;y≥x+12 |
| (4,14) | x≥0;y≥12;y≤17;y≤−2x+27 |
| (8,16) | y≥−2x+27;y≤x+12;y≥12;x≤12 |
| (16,16) | x≥12;y≥12 |
| (2,10) | x≥0;x≤4;y≥8;y≤12 |
| (6,10) | x≥4;x≤8;y≥8;y≤12 |
| (10,10) | x≥8;x≤12;y≥8;y≤12 |
| (16,8) | y≤12;x≥12;x+2y≥27;y≥x−12 |
| (2,6) | x≥0;x≤4;y≥4;y≤8 |
| (6,6) | x≥4;x≤8;y≥4;y≤8 |
| (10,6) | x≥8;x≤12;y≥4;y≤8 |
| (2,2) | x≥0;x≤4;y≥0;y≤4 |
| (6,2) | x≥4;x≤8;y≥0;y≤4 |
| (10,2) | x≥8;x≤12;y≥0;y≤4 |
| (14,4) | x≥12;x≤17;y≥0;x+2y≤27 |
| (20,4) | x≥17;y≤12;y≤x−12;y≥0 |

FIG. 6 shows the bit-error rate (BER) performance of the constellation in FIG. 3 (Cons. A) in the presence of Gaussian phase-noise as a function of SNR. The lines in this figure have the following significance:

Solid Line: Theoretical performance of 64 QAM in Additive White Gaussian Noise (AWGN)

Small Dashes: Differentially-Encoded (DE) Rectangular (Rect.) 64 QAM in AWGN

Dotted Line: DE Rect. 64 QAM with 1 degree rms phase noise

Asterisk only: DE Rect. 64 QAM with 2 degrees rms phase noise

Dash-Dot Line: DE modified (where "modified" means the use of approximated decision region boundaries, as shown in the non-jagged lines of FIGS. 3–5) 64 QAM Cons. A in AWGN Dash-3Dots Line: DE modified 64 QAM Cons. A with 1 degree rms phase noise Large Dashes: DE modified 64 QAM Cons. A with 2 degrees rms phase noise Triangles Constellation of U.S. Pat. No. 4,660,213 using optimal decoding with 2 degrees rms noise '◇' Constellation of U.S. Pat. No. 4,660,213 with 1 degree rms noise '+' Constellation of U.S. Pat. No. 4,660,213 with no phase noise Surprisingly, the suboptimal decoding of Cons. A performs better than optimal maximum likelihood (ML) decoding using the constellation of U.S. Pat. No. 4,660,213 with two degrees rms Gaussian phase-noise. The rectangular QAM constellation cannot operate reliably with two degrees rms phase noise. Making the constellation robust to two degrees rms phase noise, when compared with one degree rms, yields an increased phase noise susceptibility in terms of the phase noise level of 6 dB.

FIG. 7 compares the performance of Cons. A and Cons. B in Gaussian phase noise. The symbols on the table can be interpreted as follows, the first three sets of symbols being the same as the corresponding symbols defined in FIG. 6:

Solid line: Theoretical performance of 64 QAM in Additive White Gaussian Noise (AWGN)

Dotted line: DE rect. 64 QAM in AWGN

Asterisk only: DE rect. 64 QAM with 2 degrees rms phase noise

Small dashes: DE modified 64 QAM Cons. A in AWGN

Dash-dot line: DE modified 64 QAM Cons. A with 2 degrees rms phase noise

Dash-3dots line: DE modified 64 QAM Cons. B in AWGN

Large dashes: DE modified 64 QAM Cons. B with 2 degrees rms phase noise

The performance of constellation B is slightly worse, on the order of 0.5 dB for two degrees rms phase noise. Table IV summarizes the performance obtained for the different constellation at the BER of $10^{-5}$ using the simplified decision regions.

TABLE IV

| rms value | Cons. A (dB) | Cons. B (dB) |
|---|---|---|
| 0 degree | 0.38 | 0.64 |
| 2 degrees | 2.75 | 3.23 |

FIG. 8 shows a decoder for decoding Cons. A. Real R and imaginary I components are input to the quadrant rotator 801, which outputs absolute value signals |R| and |I|. These address ROM 802. The contents of the ROM 802 correspond to the decision regions shown in FIG. 4 which are either rectangular or modified to be rectangular according to the sub-optimal decoding scheme. A five bit number corresponding to either the read or imaginary part can denote any integer from 0 to 31. Hence the two 5-bit numbers denote a point in the real-imaginary plane. For ROM 802, the two 5 bit numbers form a 10 bit address to a point where the constellation point closest to the received point is stored. As explained earlier, only 4 bits need to be stored for each axis to represent a decision region for a constellation point in ROM 802, because all the constellation points have integer values less than 16, as shown in FIG. 4.

If the absolute value signals correspond to rectangular decision regions, decision region indications are output at 803. If the absolute value signals correspond to non-rectangular signal regions a fail signal is output at 804. If there is no fail signal at 804, switch 805 selects the outputs of ROM 802. If there is a fail signal at 804, switch 805 selects the outputs of ROM 806.

Decision regions which are non-rectangular are implemented by this ROM 806. To address ROM 806, the values |R| and |I| are fed to a subtraction means 807 which outputs a sign bit (Sign(|R|-|I|)) and the 5-bit value |R|-|I|. The 5-bit value is in turn fed to comparator 808 which compares the input to the value 11. The ROM 806 is addressed by the sign bit in combination with the comparator output. This implements the decision region for points (4,20), (15,9), (9,15), and (20,4). ROM 806 outputs according to the following table:

TABLE V

| Sign(|R|-|I|) | ||R|-|I|| > 11 or ≧ 11 | point output |
|---|---|---|
| + | true | (20,4) |
| + | false | (15,9) |
| − | true | (4,20) |
| − | false | (9,15) |

As can be seen, even in this implementation, a large ROM table is required at 802, namely $2^{10} \times 4 \times 2 = 2^{13}$. Further reductions could be made by implementing the rectangular region at the extreme bottom rights side and at the top left side, i.e. around points (3,14) and (4,13) as shown in FIG. 4, separately. FIG. 9 shows this implementation. In this figure, the unchanged elements retain the same reference numerals as in FIG. 8. A truncator 901 is added to truncate values |R| and |I|. The resulting 2 bit values are used to address ROM 902 which now has only $2^4 \times 4 \times 2 = 2^7$ bits. ROM 902 now operates according to the following table:

TABLE VI

| real input with two least significant and one most significant bits truncated | imaginary input with two least significant and one most significant bit truncated | output point |
|---|---|---|
| 00 | 00 | (2,2) |
| 01 | 00 | (6,2) |
| 10 | 00 | (10,2) |
| 00 | 01 | (2,6) |
| 01 | 01 | (6,6) |
| 10 | 01 | (10,6) |
| 00 | 10 | (2,10) |
| 01 | 10 | (6,10) |
| 10 | 10 | (10,10) |
| 11 | 11 | (15,15) |

ROM 903 is now addressed by the sign bit (Sign(|R|-|I|)) and by the outputs of 3 comparators 808, 904, and 905, which compare their inputs with the values 11, 17, and 5 respectively. 5-bit switches choose between |R| and |I| based on the value of Sign(|R|-|I|), with the inputs of switch 907 being reversed in comparison with the inputs of switch 906. When Sign(|R|-|I|) is positive, switch 906 chooses |R| and switch 907 chooses |I|. When Sign(|R|-|I|) is negative, switch 906 chooses |I| and switch 907 chooses |R|. The comparators 808, 906, 907 each give a one bit output which indicates whether the input is greater than or less than the respective numerical values, 11, 17, and 6. These outputs, in conjunction with Sign(|R|-|I|) are used to address the ROM 903, which outputs the appropriate constellation points in response to its inputs. In embodiment the points (14,3), (15, 9), (20,4), (3,14), (9,15), and (4,20) are decoded by the ROM 903 according to the following table:

TABLE VII

| |R| | |I| | Sign(|R|-|I|) | ||R|-|I|| >11 | choice by 906 and >17 | choice by 907 and >6 | point output |
|---|---|---|---|---|---|---|
| 0–6 | 12–17 | − | true and false | |I| false | |R| false | (3,14) |
| 0–12 | >17 | − | false | |I| true | |R| true or false | (4,20) |
| 6–12 | >12 | − | true | |I| true or false | |R| true | (9,15) |
| >12 | 6–12 | + | false | |R| true or false | |I| true | (15,9) |
| 12–17 | 0–6 | + | true or false | |R| false | |I| false | (14,3) |
| >17 | 0–12 | + | true | |R| true | |I| true or false | (20,4) |

FIG. 10 shows a decoder for decoding Cons. B. Like elements have been given the same reference numerals as in previous figures. ROM 1001 has been reduced in size to $2^4 \times 3 \times 2$. Rom 1001 uses the same decision table as ROM 902. However, the number of bits is decreased because the last row outputs point (16,16) rather than (15,15); and (16,16) can be expressed with three binary zeroes, while (15,15) requires four binary ones. Output 1002 now has only 6 bits rather than 8 as before. Switch 1003 has only 8 bits of output rather than 10 as before. Switch 1004 now has 5 bits of output to allow multiplication by two of its output. Comparator 1006 compares to 12, rather than 11 and comparator 1007 compares to 27 rather than to 5. Additional logic 1005 has been added, so that the input to comparator 1007 is the sum of the outputs of switches 906 and 1004. ROM 1008 decides according to the following table:

TABLE VIII

| Sign($\|R\|-\|I\|$) | $\|\|R\|-\|I\|\| > 12$ | choice by 906 and >17 | choice by 1004 and >27 | point output |
|---|---|---|---|---|
| − | true and false | $\|I\|$ false | $\|R\|$ false | (4,14) |
| − | false | $\|I\|$ true | $\|R\|$ true or false | (4,20) |
| − | true | $\|I\|$ true or false | $\|R\|$ true | (8,16) |
| + | false | $\|R\|$ true or false | $\|I\|$ true | (16,8) |
| + | true or false | $\|R\|$ false | $\|I\|$ false | (14,4) |
| + | true | $\|R\|$ true | $\|I\|$ true or false | (20,4) |

ROM 1008 now has 16×4×2 bits. Thus Cons. B has considerably reduced decoding complexity when compared to Cons. A.

I claim:

1. A decoder for decoding a QAM signal, the decoder comprising:

input means for receiving the signal;

decoding means for decoding according to a constellation including the following points having the following relative positions in the first quadrant of the Cartesian plane QAM modulation space, each of said points representing a symbol: (1.500,7.500), (1.125,5.250), (3.375,5.625), (5.625,5.625), (0.750,3.750), (2.250, 3.750), (3.750,3.750), (5.625,3.375), (0.750,2.250), (2.250,2.250), (3.750,2.250), (0.750,0.750 (2.250, 0.750), (3.750,0.750), (5.250,1.125), (7.500,1.500); and output means for supplying a decoded signal.

2. The decoder of claim 1 wherein the decoding means implements decision regions which have boundaries bisecting adjacent points of the constellation.

3. The decoder of claim 1 wherein the decoding means implements decision regions given in the following table having the following relative boundaries, points on the boundaries being classifiable in any region whose boundary those points fall on:

| Point | Intersection of the following regions being corresponding decision region |
|---|---|
| (1.500,7.500) | $x \leq 0; y \geq 6.375; y \geq x+4.125$ |
| (1.125,5.250) | $y \geq 6.375; y \geq 4.5; x \geq 0; x \leq 2.250$ |
| (3.375,5.625) | $x \geq 2.25; x \leq 4.5; y \geq 4.5; y \leq x+4.125$ |
| (5.625,5.625) | $y \geq 4.5; x \geq 4.5$ |
| (0.750,3.750) | $x \geq 0; x \leq 1.5; y \geq 3; y \leq 4.5$ |
| (2.250,3.750) | $x \geq 1.5; x \leq 3; y \geq 3; y \leq 4.5$ |
| (3.750,3.750) | $x \geq 3; x \leq 4.5; y \geq 3; y \leq 4.5$ |
| (5.625,3.375) | $y \geq 2.25; y \leq 4.5; x \geq 4.5; y \geq x-4.125$ |
| (0.750,2.250) | $x \geq 0; x \leq 1.5; y \geq 1.5; y \leq 3$ |
| (2.250,2.250) | $x \geq 1.5; x \leq 3; y \geq 1.5; y \leq 3$ |
| (3.750,2.250) | $x \geq 3; x \leq 4.5; y \geq 1.5; y \leq 3$ |
| (0.750,0.750) | $x \geq 0; x \leq 1.5; y \geq 0; y \leq 1.5$ |
| (2.250,0.750) | $x \geq 1.5; x \leq 3; y \geq 0; y \leq 1.5$ |
| (3.750,0.750) | $x \geq 3; x \leq 4.5; y \geq 0; y \leq 1.5$ |
| (5.250,1.125) | $x \geq 4.5; x \leq 6\ 375; y \geq 0; y \leq 2.25$ |
| (7.500,1.500) | $x \geq 6.375; y \geq 0; y \leq x-4.125.--$ |

4. The decoder of claim 1 wherein the received point is first scaled by 2⅔ and the decoding means implements decision regions having relative boundaries indicated in the following table, with points on boundaries being classifiable in any region whose boundaries those points fall on:

| Points | Intersection of the following regions giving the corresponding decision region |
|---|---|
| (4,20) | $y \geq 17; x \leq 0; y \geq x+11$ |
| (3,14) | $x \geq 0\ x \leq 6; y \geq 12; y \leq 17$ |
| (9,15) | $x \geq 6; x \leq 12; y \geq 12; y \leq x+11$ |
| (15,15) | $x \geq 12; y \geq 12$ |
| (2,10) | $x \geq 0; x \leq 4; y \geq 8; y \leq 12$ |
| (6,10) | $x \geq 4; x \leq 8; y \geq 8; y \leq 12$ |
| (10,10) | $x \geq 8; x \leq 12; y \geq 8; y \leq 12$ |
| (15,9) | $x \geq 12; y \geq 6; y \leq 12; y \geq x-11$ |
| (2,6) | $x \geq 0; x \leq 4; y \geq 4; y \leq 8$ |
| (6,6) | $x \geq 4; x \leq 8; y \geq 4; y \leq 8$ |
| (10,6) | $x \geq 8; x \leq 12; y \geq 4; y \leq 8$ |
| (2,2) | $x \geq 0; x \leq 4; y \geq 0; y \leq 4$ |
| (6,2) | $x \geq 4; x \leq 8; y \geq 0; y \leq 4$ |
| (10,2) | $x \geq 8; x \leq 12; y \geq 0; y \leq 4$ |
| (14,3) | $x \geq 12; x \leq 17; y \geq 0; y \leq 6$ |
| (20,4) | $x \geq 17; y \geq 0; y \leq x-11.--$ |

5. The decoder of claim 1 comprising at least one first ROM for implementing rectangular decision regions and at least one second ROM for implementing non-rectangular decision regions.

6. A decoder for decoding a QAM signal comprising:

input means for receiving the signal;

decoding means for decoding according to a constellation having the following points at the following relative positions in the first quadrant of the Cartesian plane QAM modulation space, each of said points representing a symbol: (4,20), (4,14), (8,16), (16,16), (2,10), (6,10), (10,10), (2,6), (6,6,), (10,6), (16,8), (2,2), (6,2), (10,2) (14,4), (20,4); and output means for supplying a decoded signal.

7. The decoder of claim 6 wherein the decoding means implements decision regions as indicated in the following table having the following relative boundaries, with points lying on the boundaries being classifiable in any region on whose boundaries those points lie:

| Points | Intersection of the following regions giving the corresponding decision region |
|---|---|
| (4,20) | $x \geq 0; x \leq 12; y \geq 17; y \geq x+12$ |
| (4,14) | $x \geq 0; y \geq 12; y \leq 17; y \geq -2x+27$ |
| (8,16) | $y \geq -2x+27; y \leq x+12; y \geq 12; x \leq 12$ |
| (16,16) | $x \geq 12; y \geq 1$ |
| (2,10) | $x \geq 0; x \leq 4; y \geq 8; y \leq 12$ |
| (6,10) | $x \geq 4; x \leq 8; y \geq 8; y \leq 12$ |
| (10,10) | $x \geq 8; x \leq 12; y \geq 8; y \leq 12$ |
| (16,8) | $y \leq 12; x \geq 12; x+2y \geq 27; y \geq x-12$ |
| (2,6) | $x \geq 0; x \leq 4; y \geq 4; y \leq 8$ |
| (6,6) | $x \geq 4; x \leq 8; y \geq 4; y \leq 8$ |
| (10,6) | $x \geq 8; x \leq 12; y \geq 4; y \leq 8$ |
| (2,2) | $x \geq 0; x \leq 4; y \geq 0; y \leq 4$ |
| (6,2) | $x \geq 4; x \leq 8; y \geq 0; y \leq 4$ |
| (10,2) | $x \geq 8; x \leq 12; y \geq 0; y \leq 4$ |
| (14,4) | $x \geq 12; x \leq 17; y \geq 0; x+2y \leq 27$ |
| (20,4) | $x \geq 17, y \leq 12; y \leq x-12; y \geq 0.--$ |

8. The decoder of claim 6 wherein the decoding means implements decision regions which have boundaries which bisect lines between adjacent points of the signal constellation.

9. The decoder of claim 6 wherein the decoding means includes at least one first ROM for implementing rectangular decision regions and at least one second ROM for implementing non-rectangular decision regions.

10. A decoder for decoding quadrature amplitude modulated signals comprising:
    input means for receiving a coded signal;
    a memory for storing predetermined information relating to an encoding of said coded signal;
    decoding means for decoding a signal based on a plurality of decision regions having boundaries, said plurality of decision regions being determined by said information stored in said memory;
    at least one of the decision regions having a boundary not aligned with at least one other of said boundaries of said decision regions, so that phase noise is reduced,
    at least one of which boundaries being an approximated boundary which approximates but does not equal a line which bisects adjacent constellation points,
    at least one of the decision regions being rendered rectangular by use of the approximated boundary; and
    output means for providing a decoded signal
    wherein the decoder comprises at least one first ROM for implementing rectangular decision regions and at least one second ROM for implementing non-rectangular decision regions.

11. A decoder for decoding quadrature amplitude modulated signals comprising:
    input means for receiving a coded signal;
    a memory for storing predetermined information relating to an encoding of said coded signal;
    decoding means for decoding a signal based on a plurality of decision regions having boundaries, said plurality of decision regions being determined by said information stored in said memory;
    at least one of the decision regions having a boundary not aligned with at least one other of said boundaries of said decision regions, so that phase noise is reduced;
    at least one of which boundaries being an approximated boundary which approximates but does not equal a line which bisects adjacent constellation points;
    at least one of the decision regions being rendered rectangular by use of the approximated boundary; and
    output means for providing a decoded signal;
    wherein for non-rectangular boundaries the decoding means comprises a comparator for comparing first and second values, the first value representing a difference based on a slope of a line boundary and the second value representing an intercept of the line boundary with an axis of a space in which said coded signals are modulated.

12. A decoder for decoding a QAM signal based on a plurality of constellation points, the decoder comprising:
    means for deriving absolute values of real and imaginary components of the signal;
    means for calculating a difference between the absolute values of the real and imaginary components and for supplying a sign of said difference;
    a comparator for comparing one of the absolute value of the real component, the absolute value of the imaginary component, and said difference, with a predetermined value and producing an output signal; and
    a look up table having address inputs for receiving address data including said sign and said output signal of said comparator.

13. The decoder of claim 12 further comprising switch means for choosing either the absolute value of the real component or the absolute value of the imaginary component responsive to said sign; and
    wherein said comparator compares an output of said switch means with said predetermined value.

14. A method of receiving digital information from a quadrature amplitude modulated carrier, said quadrature amplitude modulated carrier having a non-rectangular modulation constellation scheme having decreased susceptibility to phase noise over a rectangular modulation constellation scheme, the method comprising the steps of:
    (a) receiving the modulated carrier signal;
    (b) demodulating the carrier signal by assigning one of a plurality of decision regions corresponding to said decreased phase noise susceptibility quadrature amplitude modulation scheme,
        I. at least one of said decision regions having at least one decision boundary between adjacent states which approximates but does not equal bisecting a line between adjacent constellation points, and
        ii. at least one of said decision regions being an asymmetric quadrilateral; and
    c. outputting digital data;
    wherein said assigning further comprises the step of determining whether the carrier signal has modulated components within a rectangular decision region based on a boundary parallel to a modulation coordinate axis or within a non-rectangular decision region based on a slope and an intercept of at least one decision region boundary.

15. A QAM demodulator for demodulating a QAM signal, the demodulator comprising
    means for receiving the QAM signal, which signal has a modulation constellation scheme, the scheme including a first portion of modulation states in a rectangular array and a second portion of modulation states not in a rectangular array,
    means for recognizing each of said signal modulation states according to a respective one of a plurality of decision regions having boundaries, the means for recognizing including
        first means for assigning a modulation state for said first portion, the first means having a first set of circuit elements; and
        second means for assigning a modulation state for said second portion, the second means having a second set of circuit elements, said second set containing different types of circuite elements from said first set.

16. The QAM demodulator according to claim 15, wherein
    said first means for assigning comprises a first memory for storing a first set of data for decoding modulation states in said first portions and
    said second means for assigning comprises a second memory for storing a second set of data for decoding modulation states in said second portion.

17. The QAM demodulator according to claim 15,
    further comprising means for determining whether a current modulation state of the signal is in said first portion or said second portion, and for using an output one of said first or second assigning means in response to said determining
    at least one of said second portion of states having a decision boundary between adjacent states which is neither tangent to a circle having a center at the constellation origin nor bisecting a line between adjacent constellation points.

18. A QAM demodulator for demodulating a QAM signal having a modulation constellation scheme having a plurality of modulation states in an array having a first portion of states proximal to the origin in a regular rectangular arrangement and a second portion of states distal from the origin in a non-rectangular arrangement, having a reduced computational complexity decoder having a divided modulation space with a rectangularly modulated portion proximal to the origin and a non-rectangularly modulated portion distal to the origin, at least one of said distal portion of states having a decision boundary between adjacent states which does not bisect adjacent constellation points, said decoder distinguishing between at least two adjacent states of said second portion by defining a slope and an intercept of said decision boundary with respect to the real and imaginary modulation axes.

19. The decoder according to claim 10, herein said first ROM is a 1024 address ROM and said second ROM is a 4 address ROM.

20. The decoder according to claim 10, wherein said first ROM is a 16 address ROM and said second ROM is a 16 address ROM.

21. The decoder of claim 11 wherein for non-rectangular boundaries the decoding means comprises a plurality of comparators for comparing first and second values, said first value representing a difference based on a slope of a line boundary and the second value representing an intercept of said line boundary with an axis of a space in which the said coded signals are modulated.

* * * * *